(12) United States Patent
Osara et al.

(10) Patent No.: US 9,481,250 B2
(45) Date of Patent: Nov. 1, 2016

(54) MINING VEHICLE

(71) Applicant: SANDVIK MINING AND CONSTRUCTION OY, Tampere (FI)

(72) Inventors: Jukka Osara, Tampere (FI); Samuli Kouhia, Tampere (FI)

(73) Assignee: SANDVIK MINING AND CONTRUCTION OY, Tampere (FI)

( * ) Notice: Subject to any disclaimer, the term of this patent is extended or adjusted under 35 U.S.C. 154(b) by 0 days.

(21) Appl. No.: 14/355,600

(22) PCT Filed: Oct. 31, 2012

(86) PCT No.: PCT/FI2012/051051
§ 371 (c)(1),
(2) Date: May 1, 2014

(87) PCT Pub. No.: WO2013/064738
PCT Pub. Date: May 10, 2013

(65) Prior Publication Data
US 2014/0262664 A1 Sep. 18, 2014

(30) Foreign Application Priority Data
Nov. 1, 2011 (FI) ..................... 20116077

(51) Int. Cl.
*B60L 5/00* (2006.01)
*B60L 9/24* (2006.01)
(Continued)

(52) U.S. Cl.
CPC ............... *B60L 5/005* (2013.01); *B60L 1/003* (2013.01); *B60L 9/24* (2013.01); *E21B 7/02* (2013.01); *E21F 17/06* (2013.01); *H02J 3/1878* (2013.01); *B60L 2200/40* (2013.01); *Y02E 40/30* (2013.01)

(58) Field of Classification Search
CPC ........... B60L 1/00; B60L 1/003; B60L 5/00; B60L 9/00; B60L 9/02; B60L 9/08; B60L 9/16
USPC ..... 191/2–5, 12 R–12.4, 22 R, 33 R, 40, 41, 191/50, 51
See application file for complete search history.

(56) References Cited

U.S. PATENT DOCUMENTS 5,327,355 A 7/1994 Chiba et al.
7,053,568 B2 * 5/2006 Rudinec ............. B60L 11/1803
180/243

(Continued)

FOREIGN PATENT DOCUMENTS

CN 2117630 U 9/1992
CN 2445505 Y 8/2001
(Continued)

*Primary Examiner* — R. J. McCarry, Jr.
(74) *Attorney, Agent, or Firm* — Corrine R. Gorski

(57) ABSTRACT

A mining vehicle includes electric components, devices or machines operating at alternating voltage and having a specific nominal voltage. Power is fed to the mining vehicle from an alternating current network with a specific voltage level. The mining vehicle further includes a transformer arranged to transform the voltage level of the alternating current network into the nominal voltage. When a voltage higher than the nominal voltage is fed to the transformer, the transformer lowers this higher voltage to the nominal voltage. When a voltage lower than the nominal voltage is fed to the transformer, the transformer raises the voltage to the nominal voltage. The transformer is arranged to feed the electric component, device or machine both when a voltage lower than the nominal voltage is fed to the transformer and when a voltage higher than the nominal voltage is fed to the transformer.

12 Claims, 2 Drawing Sheets

(51) Int. Cl.
  *E21F 17/06* (2006.01)
  *E21B 7/02* (2006.01)
  *H02J 3/18* (2006.01)
  *B60L 1/00* (2006.01)

(56) References Cited

U.S. PATENT DOCUMENTS

2007/0096538 A1* 5/2007 Niemi .................. E21C 35/24
                                                    299/1.05
2012/0274303 A1   11/2012 Yamamori et al.
2012/0298004 A1   11/2012 Osara et al.

FOREIGN PATENT DOCUMENTS

| CN | 1781168 A      | 5/2006  |
| DE | 4037531 A1     | 2/1992  |
| JP | H08137561 A    | 5/1996  |
| JP | H10207557 A    | 8/1998  |
| JP | 2003125536 A   | 4/2003  |
| JP | 2004080965 A   | 3/2004  |
| WO | 2011080391 A1  | 12/2010 |
| WO | 2011080391 A1  | 7/2011  |
| WO | 2011080392 A1  | 7/2011  |
| WO | 2013064738 A1  | 10/2012 |

* cited by examiner

MINING VEHICLE

RELATED APPLICATION DATA

This application is a §371 National Stage Application of PCT International Application No. PCT/FI2012/051051 filed Oct. 31, 2012 claiming priority of FI Application No. 20116077, filed Nov. 1, 2011.

BACKGROUND OF THE INVENTION

The invention relates to a mining vehicle comprising at least one electric component, apparatus or machine operating at alternating voltage and having a specific nominal voltage, a connection cable for the power supply to the mining vehicle, a cable reel for the connection cable, connecting means for connecting the mining vehicle to an alternating current network, and a transformer arranged to transform the voltage level of the alternating current network into the nominal voltage.

Further, the invention relates to a method for energy supply to a mining vehicle, the mining vehicle comprising at least one electric component, apparatus or machine operating at alternating voltage and having a specific nominal voltage, whereby the method comprises supplying power to the mining vehicle from an alternating current network with a specific voltage level, the mining vehicle having a transformer by means of which the voltage level of the alternating current network is, as required, transformed into the nominal voltage.

The operation devices of rock drilling rigs are typically electrically operated. Thus, at least at the work sites during the working stages, the rock drilling rig is connected to an electric network. Particularly on tunnel work sites and in other objects of contract work, the rock drilling rig is used for rather a short time of its whole life span, and after it has been used on one work site, it is transferred to another one. Transfer from one work site to another will only be successful if the voltage levels of the electric networks on the work sites are the same. If the voltage levels of the electric networks on different work sites are different, the voltage level should be transformed by a transformer to be suitable for the operation device of the rock drilling rig but, in practice, the size of the required transformer and thus the difficulty to handle it and the subsequent costs are so great that rock drilling rigs are only used at work sites where the voltage level of the electric network feeding them is suitable for their operation devices. Further, the rock drilling rig could be transformed to have a suitable voltage level by changing electric components, such as protective switches, contactors, cables and motors to suit the voltage level of the electric supply network. Also this alternative is, in practice, far too difficult to be implemented.

Publication WO2011/080391 discloses a rock drilling rig with electrically operated operation devices, and means for connecting the rock drilling rig to an electric network. The rock drilling rig comprises electrically operated operation devices with two different voltage levels, some of them being fed directly from the electric network and some through a transformer. The rock drilling rig can be operated while being connected to at least two electric networks having different voltage levels. The transformer does not have to be of a very large size because only some of the operation devices of the rock drilling rig need to be fed through it. Nevertheless, electrically operated operation devices with two different voltage levels must be used in the rock drilling rig.

BRIEF DESCRIPTION OF THE INVENTION

It is an object of the present invention to provide a novel mining vehicle.

The mining vehicle according to the invention is characterized in that a voltage lower than the nominal voltage and a voltage higher than the nominal voltage are feedable to the transformer, whereby, when a voltage lower than the nominal voltage is fed to the transformer, the transformer raises the voltage to the nominal voltage, and when a voltage higher than the nominal voltage is fed to the transformer, the transformer lowers this higher voltage to the nominal voltage, the transformer being arranged to feed the electric component, device or machine both when a voltage lower than the nominal voltage is fed to the transformer and when a voltage higher than the nominal voltage is fed to the transformer.

Further, the solution according to the invention is characterized by raising the voltage to the nominal voltage by the transformer when a voltage lower than the nominal voltage is fed to the transformer, and lowering the higher voltage to the nominal voltage by the transformer when a voltage higher than the nominal voltage is fed to the transformer, and feeding the electric component, device or machine by the transformer both when a voltage lower than the nominal voltage is fed to the transformer and when a voltage higher than the nominal voltage is fed to the transformer.

In the presented solution, the mining vehicle comprises electric components, devices or machines operating at alternating voltage and having a specific nominal voltage. The mining vehicle further comprises a supply cable for the power supply to the mining vehicle, a cable reel for the supply cable, connecting means for connecting the mining vehicle to an alternating current network, and a transformer arranged to transform the voltage level of the alternating current network to the nominal voltage. A voltage lower than the nominal voltage and a voltage higher than the nominal voltage may be fed to the transformer according to the voltage level of the electric network of the mine. When a voltage lower than the nominal voltage is fed to the transformer, the transformer raises the voltage to the nominal voltage. When a voltage higher than the nominal voltage is fed to the transformer, the transformer lowers this higher voltage to the nominal voltage. The transformer is arranged to feed the electric component, device or machine both when a voltage lower than the nominal voltage is fed to the transformer and when a voltage higher than the nominal voltage is fed to the transformer. In this way, the electric components, devices or machines of the mining vehicle may have a specific nominal voltage, and the mining vehicle can still be connected to electric networks with different voltage levels. Thus, the mining vehicle can be easily transferred from one work site to another, irrespective of the voltage level of their supply networks; in other words, there is no need to manufacture mining vehicles with different electric devices for different voltage levels of the electric network. Thus, in the manufacture of mining vehicles, the same components and solutions can be used for several different purposes of use. Further, a device can be configured for the voltage used by the customer at a fairly late manufacturing stage, and the customer may also change the voltage connection to be according to their wishes.

The mining vehicle comprises one or more of the following mining work devices: a rock drilling machine, bolting machine, shotcreting device, scaling device, injection device, blasthole charger, loading device, measuring device, or drilling, sealing and explosive-feeding equipment used in small-charge excavation. The rock drilling machine may be a face drilling device, or a device used in production hole drilling, that is a long-hole drilling device that drills boreholes in fan shape. The mining work device is an actuator used for handling undetached rock, and it performs several consecutive operations according to a given work cycle. Typically, several similar operations are done with the mining work device at a single work site. These operations may be defined in an excavation plan, such as a drilling plan, charging plan, or corresponding mining plan. The mining work device is normally arranged on a boom with which the device is moved during the work cycle. On the other hand, the mining work device may be arranged on a corresponding support or support structure in a mining vehicle, which can support the device during its work cycle.

BRIEF DESCRIPTION OF THE FIGURES

Some embodiments of the invention will be explained in greater detail in the attached drawings, in which.

In the figures, some embodiments of the invention are shown simplified for the sake of clarity. Like reference numerals refer to like parts in the figures.

DETAILED DESCRIPTION OF THE INVENTION

Figure 1:
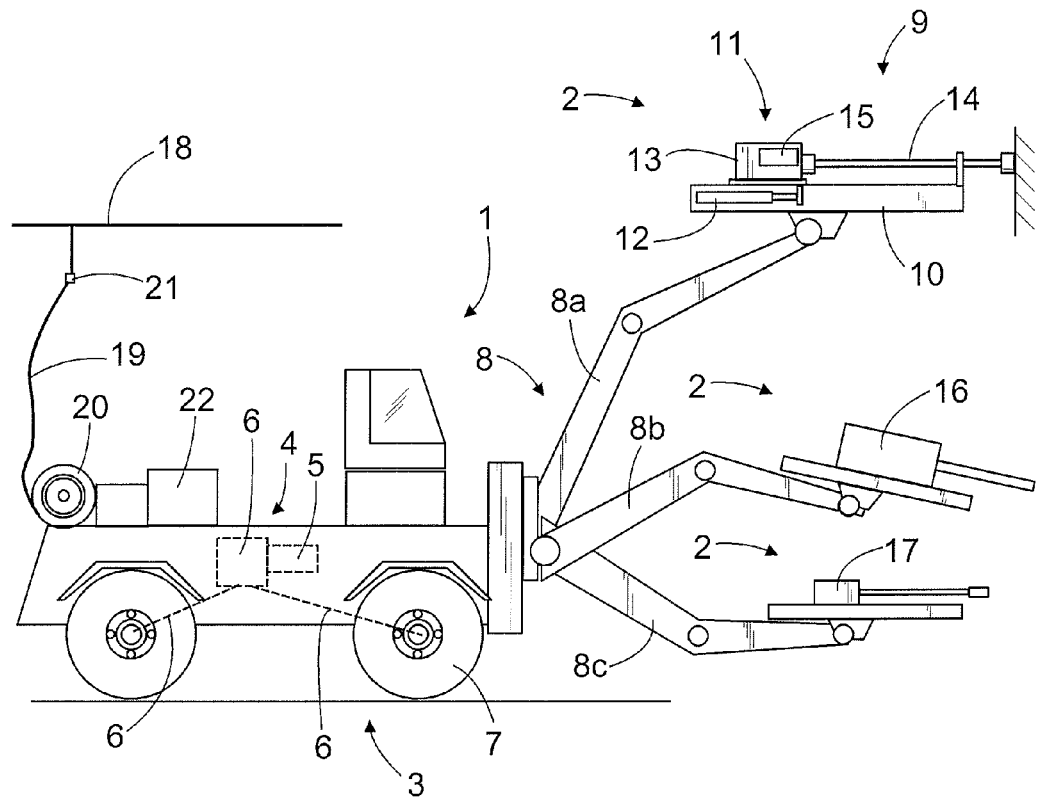
FIG. 1 is a schematic side representation of a rock drilling rig.

FIG. 1 shows a rock drilling rig that is one example of a mining vehicle 1. The rock drilling rig is provided with one or more mining work devices 2. The rock drilling rig comprises a carrier 3 which can be moved by means of drive equipment 4. The drive equipment 4 comprises one or more drive motors 5 and one or more power transmission means 6 for transmitting drive power to one or more wheels 7. The drive power transmission may comprise a mechanical gear system and mechanical power transmission members or, alternatively, the drive power transmission may be hydraulic or electric. There may be one or more booms 8 arranged on the carrier 3, and the boom may be equipped with a mining work device 2. In the embodiment shown in FIG. 1, a first boom 8a is a drilling boom, at the outermost end of which there is a rock drilling unit 9 comprising a feed beam 10, along which a rock drilling machine 11 can be moved by means of a feed device 12. The rock drilling machine 11 may comprise a percussion device 13 for generating impact pulses on a tool, and a rotating device 15 for rotating the tool 14 around its longitudinal axis. There may be several of these drilling booms 8a in the rock drilling rig. By way of example, a second boom 8b is shown to comprise a bolting device 16, with which rock bolts can be arranged in pre-drilled boreholes to support the excavated rock cavern. In the embodiment of FIG. 1, a third boom 8c is equipped with a measuring device 17 for measuring drilled boreholes. Other alternative mining work devices 2 include injection devices used in feeding sealing material into rock, devices used in small-charge excavation, and blasthole chargers used for feeding explosives.

FIG. 1 further shows an electric network 18 that may be fixedly constructed, or it may consist of a modifiable network. The electric network 18 is typically a three-phase alternating current network. When the mining vehicle is at the work site, its mining work devices, hydraulic system and any necessary auxiliary systems are driven mainly by electric energy obtained from an external electric network. The rock drilling rig may be connected to the electric network 18 with one or more connection cables 19. The connection cable 19 is arranged on a reel 20 and it may be equipped with a suitable connector 21 that can be connected to the supply terminal of the electric network 18. The rock drilling rig 1 is further provided with a transformer 22, through which the electricity supplied from the electric network 18 is conducted to the rock drilling rig 1 for the various operation devices. The structure and connection of the transformer 22 are described in more detail in connection with FIGS. 2 and 3.

Figure 2:
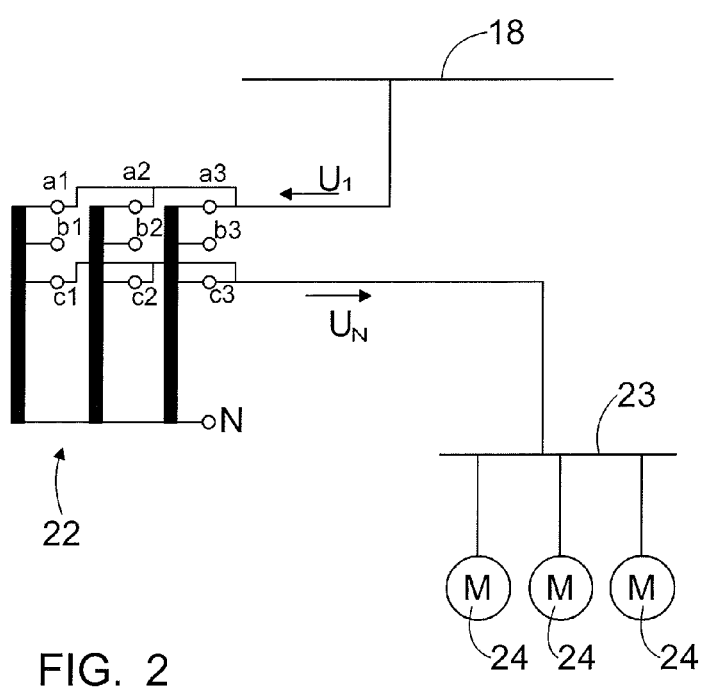
FIGS. 2 and 3 are diagrams of the power supply arrangement of a rock drilling rig.

The transformer 22 is thus connected to the electric network 18 of the mine. In the case of FIG. 2, the voltage of the electric network of the mine may be, for example, 1 000 volts. The nominal voltage $U_N$ of the electric components, devices or machines of the rock drilling rig may then, in turn, be 690 volts, for example. That is, the transformer 22 lowers the voltage $U_1$ of the electric network, i.e. 1 000 volts, to the nominal voltage $U_N$, i.e. to 690 volts.

Figure 3:
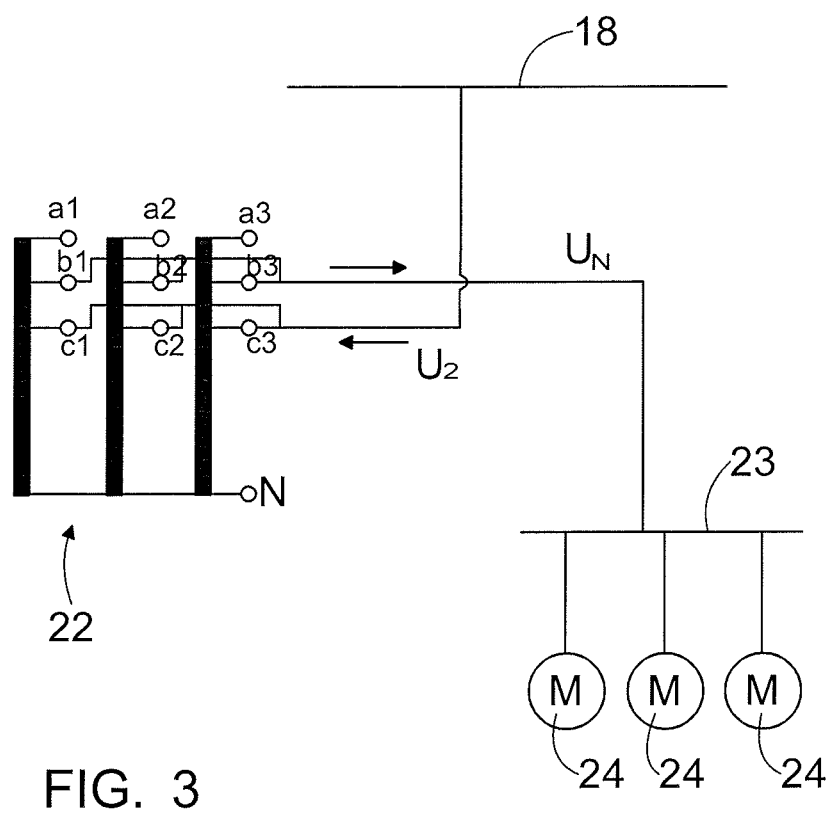

The nominal voltage $U_N$ is thus fed from the transformer 22 to the electric components, devices or machines of the mining vehicle. In FIGS. 2 and 3, examples of these are a master main distribution board 23 and three-phase motors 24. The electric motors 24 may represent the power units of the rock drilling rig, for instance. Other corresponding components, devices or machines of the mining vehicle may be, for example, the electric motor of a compressor, a water pump, a socket for auxiliary functions, a control transformer, drive equipment, pumps and other auxiliary devices as well as other corresponding electrically operated devices.

In the case of FIG. 3, the nominal voltage $U_N$ may also be the same as in the case shown in FIG. 2, i.e. for instance 690 volts. By contrast, in the case of FIG. 3, the voltage U2 of the electric network may be 525 volts, for example. Then, the transformer 22 raises the voltage U2, i.e. for instance 525 volts, to the nominal voltage $U_N$, i.e. for instance to 690 volts. In the case of FIG. 3, the same nominal voltage $U_N$ as in the case of FIG. 2 is thus fed to the electric components, devices or machines through the transformer 22, although the mining vehicle is operated, in FIG. 3, in the alternating current network of the mine that has a voltage different from that in FIG. 2. FIGS. 2 and 3 thus show the same mining vehicle, and only the input and output connections of the transformer 22 are implemented in different manners.

Hence, when a voltage higher than the nominal voltage $U_N$ is fed to the transformer, the transformer lowers this higher voltage to the nominal voltage $U_N$. Further, when a voltage lower than the nominal voltage $U_N$ is fed to the transformer, the transformer raises the voltage to the nominal voltage $U_N$. Thus, all electric components, devices or machines of the mining vehicle may have the same nominal voltage $U_N$. When the voltage of the electric network of the mine corresponds to the nominal voltage $U_N$, the transformer is bypassed, i.e. the electric components, devices or machines are fed directly from the electric network of the mine. Further, given components, such as three-phase alternating current motors, have a given nominal voltage in star connection, and, correspondingly, in delta connection motors can be supplied with a voltage that is the named voltage divided by the number $\sqrt{3}$. Hence, in such a case, the procedure may be that when the nominal voltage $U_N$ in star connection is 690 volts and the voltage of the electric network is 690 volts, the transformer 22 is bypassed and the electric motors are fed directly from the electric network and connected in star connection. When the voltage of the electric network is 1 000 volts, the voltage is lowered to 690 volts by the transformer 22 and, further, the electric motors are operated in star connection. When the voltage of the electric network is 525 volts, the voltage is raised to 690 volts by the transformer 22 and, further, the electric motors are operated in star connection. By contrast, if the voltage of the electric network is 400 volts, the transformer 22 is bypassed and the electric motor or motors are connected in delta connection. In this way, a simple and overall economical solution can be achieved for operating a mining vehicle in electric networks with several different voltage levels.

Naturally, the voltage levels presented here are merely examples, and the solution can be applied to desired voltage levels, as required. Further, the voltage of the supply network, for example, may typically vary even by dozens of volts without any changes being required for the constructions or connections of the electric devices.

Typically, for example electric motors can be operated at the same power, irrespective of the frequency, in other words the frequency may be, for example, 50 hertz or 60 hertz. At different frequencies, the electric motors certainly rotate at different speeds, but the power taken off from the motors is independent of the frequency. With regard to the dimensioning of the transformer, the frequency is typically of no relevance because the transformers are dimensioned to operate for example in a frequency range of 47 to 63 hertz. In the embodiment of FIGS. 2 and 3, the transformer 22 has three tapping points or taps, i.e. a1 to a3, b1 to b3 and c1 to c3. The transformer 22 may also be implemented by two tapping points or four or more tapping points.

If desired, when using a transformer with three tapping points, for instance, the electric components, devices or machines may be fed by always using the middlemost tapping point, i.e. b1 to b3. If the voltage of the electric network of the mine is higher than the nominal voltage, it is connected to the tapping point a1 to a3. If, by contrast, the voltage of the electric network of the mine is lower than the nominal voltage $U_N$, it is connected to the tapping point c1 to c3. Then, however, the transformation ratio of the tapping points a1 to a3 to c1 to c3 becomes rather high; for example at the presented voltages 525, 690 and 1 000 volts, it is 1.90.

In the solution of FIGS. 2 and 3, in contrast, the tapping point from which the nominal voltage is fed to the electric components, devices or machines of the mining vehicle is changed. Thus, when the voltage $U_1$ of the electric network is 1 000 volts, for example, it is connected to the tapping point a1 to a3, and the nominal voltage $U_N$ is taken off from the tapping point c1 to c3. If the voltage of the electric network is 525 volts, for example, it is fed to the tapping point c1 to c3, and the nominal voltage $U_N$ is taken off from the tapping point b1 to b3. Thus, the transformation ratio of the transformer, i.e. the ratio of the tapping point a1 to a3 to the tapping point c1 to c3 is about 1.45. In practice, the winding wire of the transformer is dimensioned according to the lowest voltage used, at which voltage there is thus the highest current passing in the winding wire. This contributes to the fact that, in practice, the size of the transformer does not become quite as much smaller as the difference between the above-mentioned transformation ratios. Changing the tapping point from which the nominal voltage is fed to the electric components, devices or machines of the mining vehicle allows the transformer to be made significantly smaller than what is presented above. Thus, in this solution, the same winding area is used in the transformer 22 both when the voltage is raised and when the voltage is lowered.

Preferably, the transformer 22 is a single-winding transformer. A single-winding transformer may also be called an autotransformer or an auto step-down transformer. A single-winding transformer does not decrease short-circuit currents, which are typically already rather weak, in mining work sites. Further, the standard power of a single-winding transformer is lower than the standard power of a two-winding transformer with a corresponding nominal power. In some cases, features disclosed in this application may be used as such, regardless of other features. On the other hand, when necessary, features disclosed in this application may be combined in order to provide various combinations.

The drawings and the related description are only intended to illustrate the idea of the invention. Details of the invention may vary within the scope of the claims.

In connection with the transformer 22, one or more cooling fans may be arranged. A cooling fan allows the transformer 22 to be cooled, whereby the transformer can be made smaller in physical size than without cooling by blowing. Further, the suction and blowing velocity of the fan can be controlled according to the load of the transformer. Further, in connection with the transformer 22, temperature measurement may be arranged by means of which the transformer can be protected. On the basis of the temperature measurement, for instance the operating power taken off by the mining vehicle can be controlled if there is a risk of the transformer becoming overloaded. For example in the case of a rock drilling rig, the drilling power taken off by the rig can be lowered, if required.

The invention claimed is:

1. A mining vehicle comprising:
   at least one electric component operating at alternating voltage and having a specific nominal voltage;
   a connection cable for supplying power to the mining vehicle;
   a cable reel for supporting the connection cable;
   connecting means for connecting the mining vehicle to an alternating current network; and
   a transformer arranged to transform a voltage level of the alternating current network into a nominal voltage, the transformer including at least first and second tapping points determining the transformation ratio of the transformer, the alternating current network being arranged to be connected to one of the at least first and second tapping points and the electric component being arranged to be fed from the other of the at least first and second tapping points, wherein a voltage lower than the nominal voltage and a voltage higher than the nominal voltage are feedable to the transformer, wherein when the voltage lower than the nominal voltage is fed to the transformer, the transformer raises the voltage to the nominal voltage, and when the voltage higher than the nominal voltage is fed to the transformer, the transformer lowers the higher voltage to the nominal voltage, the transformer being arranged to feed the electric component both when the voltage lower than the nominal voltage is fed to the transformer and when the voltage higher than the nominal voltage is fed to the transformer.

2. A mining vehicle as claimed in claim 1, wherein the mining vehicle includes at least two electric motors, the at least two electric motors having the same nominal voltage.

3. A mining vehicle as claimed in claim 1, wherein the transformer is a single-winding transformer.

4. A mining vehicle as claimed in claim 3, wherein the transformer includes a plurality of tapping points, the tapping points being formed such that the transformer uses the same winding area when the voltage is raised and when the voltage is lowered, the nominal voltage of each tapping point being changeable according to whether the voltage is raised or lowered.

5. A mining vehicle as claimed in claim 1, wherein the mining vehicle is a rock drilling rig.

6. A method for supplying energy to a mining vehicle, the mining vehicle including at least one electric component operating at alternating voltage and having a specific nominal voltage, the method comprising the steps of:
supplying power to the mining vehicle from an alternating current network having a specific voltage level, the mining vehicle having a transformer that transforms the voltage level of the alternating current network, as required, into the nominal voltages, the transformer including at least first and second tapping point determining the transformation ratio of the transformer;
connecting the alternating current network to one of the at least first and second tapping points;
feeding the electric component from the other of the at least first and second tapping points;
raising the voltage to the nominal voltage by the transformer when a voltage lower than the nominal voltage is fed to the transformer and lowering a higher voltage to the nominal voltage by the transformer when a voltage higher than the nominal voltage is fed to the transformer; and
feeding the at least one electric component by the transformer both when the voltage lower than the nominal voltage is fed to the transformer and when the voltage higher than the nominal voltage is fed to the transformer.

7. A method as claimed in claim 6, further comprising bypassing the transformer in a power supply when the voltage level of the alternating current network corresponds to the nominal voltage.

8. A method as claimed in claim 7, further comprising using in the mining vehicle at least one three-phase alternating current motor, which has the nominal voltage in star connection, and bypassing the transformer in the power supply also when the voltage level of the alternating current network is the nominal voltage divided by the number $\sqrt{3}$, and, at the same time, connecting the electric motor in delta connection.

9. A method as claimed in claim 6, wherein the mining vehicle uses at least two electric motors in such a way that all of the electric motors have the same nominal voltage.

10. A method as claimed claim 6, further comprising using a single-winding transformer as the transformer.

11. A method as claimed in claim 6, further comprising changing a nominal voltage tapping point according to whether the voltage is raised or lowered.

12. A method as claimed in claim 6, wherein the mining vehicle is a rock drilling rig.

* * * * *